United States Patent [19]

Cimenti

[11] Patent Number: 4,766,739

[45] Date of Patent: Aug. 30, 1988

[54] SIMPLIFIED CREAM WHIPPER

[76] Inventor: Antonio Cimenti, Via Baron 15, 30027 S. Dona' Di Piave (VE), Italy

[21] Appl. No.: 37,835

[22] Filed: Apr. 13, 1987

[30] Foreign Application Priority Data

May 2, 1986 [IT] Italy .............................. 60377/86[U]

[51] Int. Cl.[4] ............................................ F25D 19/00
[52] U.S. Cl. ........................................ 62/298; 62/314
[58] Field of Search .................. 62/306, 314, 342, 298

[56] References Cited

U.S. PATENT DOCUMENTS

| 3,272,132 | 9/1966 | Stoelting et al. | 62/342 X |
| 3,317,198 | 5/1967 | Phelan et al. | 62/342 X |
| 3,365,910 | 1/1968 | Grose | 62/306 |
| 4,045,976 | 9/1977 | Mills | 62/342 X |
| 4,412,428 | 11/1983 | Giannella et al. | 62/342 X |
| 4,617,802 | 10/1986 | Fiedler | 62/342 X |

Primary Examiner—William E. Topolcai
Attorney, Agent, or Firm—Wegner & Bretschneider

[57] ABSTRACT

A simplified cream whipper includes a refrigeration unit, a vessel for holding the cream and a whipping assembly to aspirate, whip and deliver cream. The assembly includes an aspiration-compression unit, a unit to whip the cream, and a delivery unit, the components being capable of being dismantled by being withdrawn from one another and of being cleaned easily and individually.

11 Claims, 5 Drawing Sheets

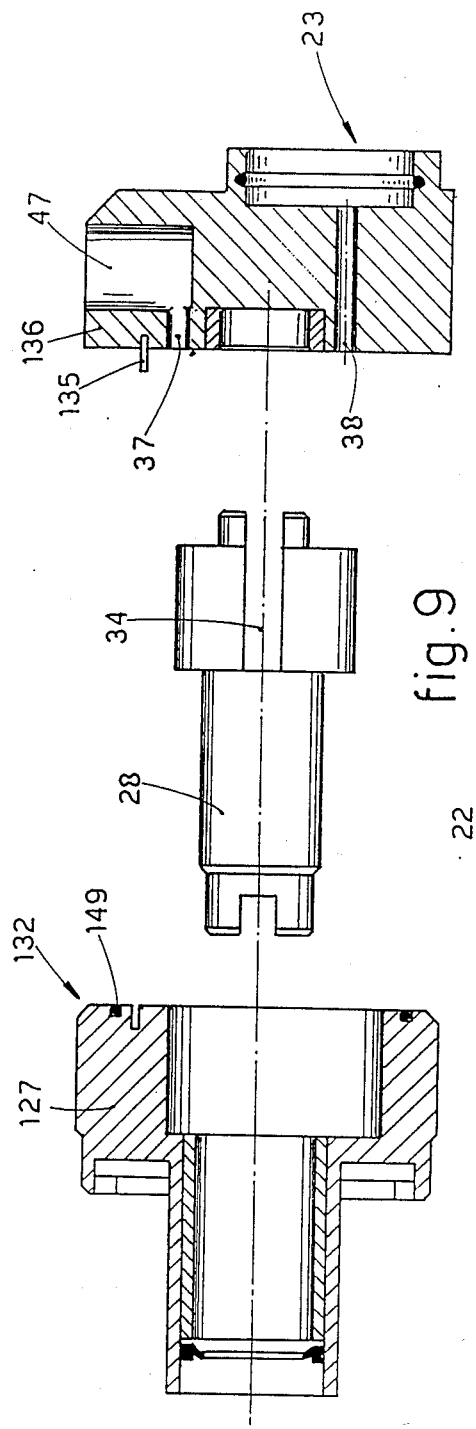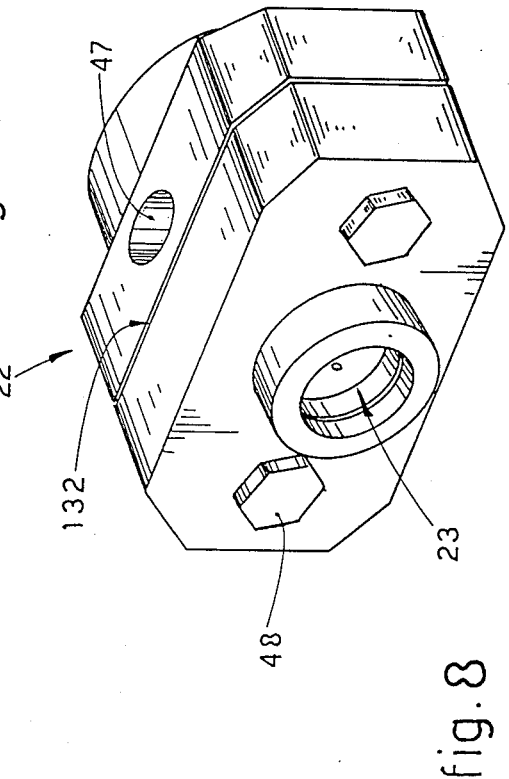

SIMPLIFIED CREAM WHIPPER

FIELD OF APPLICATION

This invention concerns a simplified cream whipper. To be more exact. The invention concerns a cream whipper for commercial use which is distinguished by being simple.

STATE OF THE ART

Known commercial cream whippers for icecream counters in general entail hygiene problems owing to the complex operations involved in assembling and dismantling them. They also cause hygiene problems owing to the tortuous paths followed by the cream within them.

Such known embodiments, which entail complexity of assembly and dismantling and also tortuous paths for the cream, create noteworthy hygiene problems since certain parts are not readily accessible and in certain cases the whippers cannot be dismantled or can only be partly dismantled owing to their complexity.

IDEA OF THE SOLUTION

So as to avoid such problems and to obtain a commercial cream whipper which can be easily dismantled and cleaned as regards its most remote recesses, the present applicant has designed, tested and embodied this invention.

The invention will be described hereinafter with the help of the attached figures.

The invention is therefore embodied with a simplified cream whipper which comprises a refrigeration unit, a vessel to hold cream and a whipper assembly to aspirate, form and deliver cream, the above whipper assembly being characterized in that it includes an aspiration-compression unit, a unit to form the cream and a delivery unit, the components being capable of being dismantled by being withdrawn from one another and of being cleaned easily and individually.

DESCRIPTION OF THE FIGURES

The attached figures, which are given as a non-restrictive example, show the following:

FIGS. 8 and 9 show a three-dimensional and a knockdown variant respectively of the pump unit.

DISCLOSURE OF THE INVENTION

Figure 1:
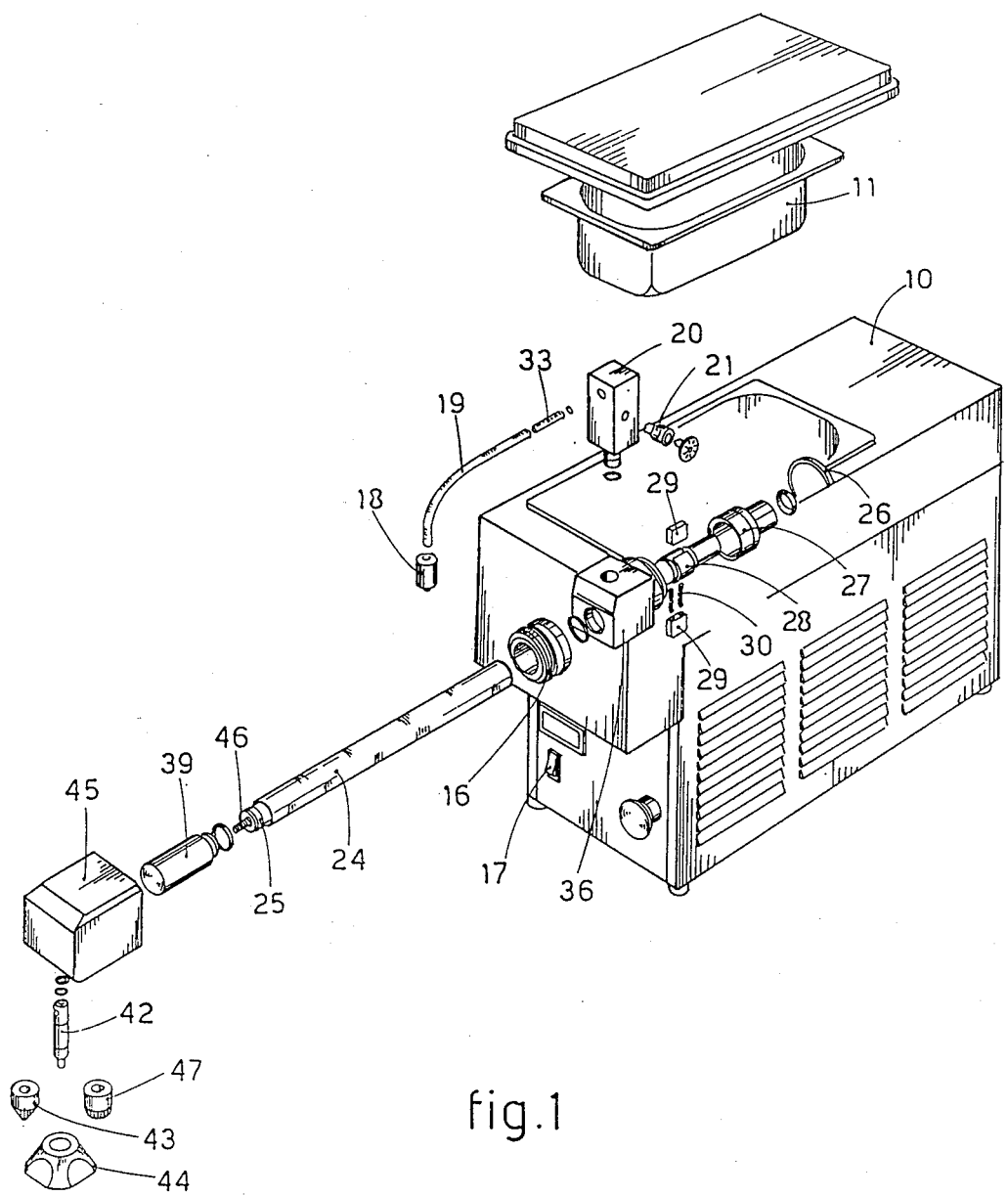
FIG. 1 shows a cream whipper according to the invention with the components dismantled.
Figure 2:
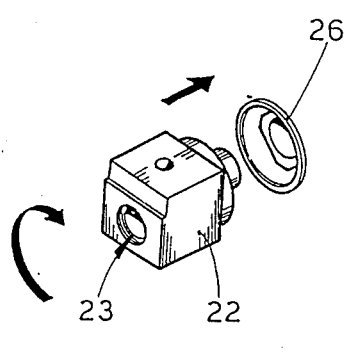
FIGS. 2 to 5 show some of the parts of the embodiment of FIG. 1.
Figure 3:
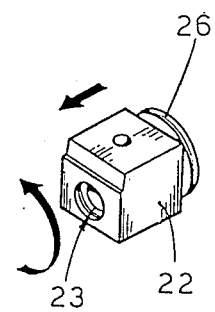
Figure 6:
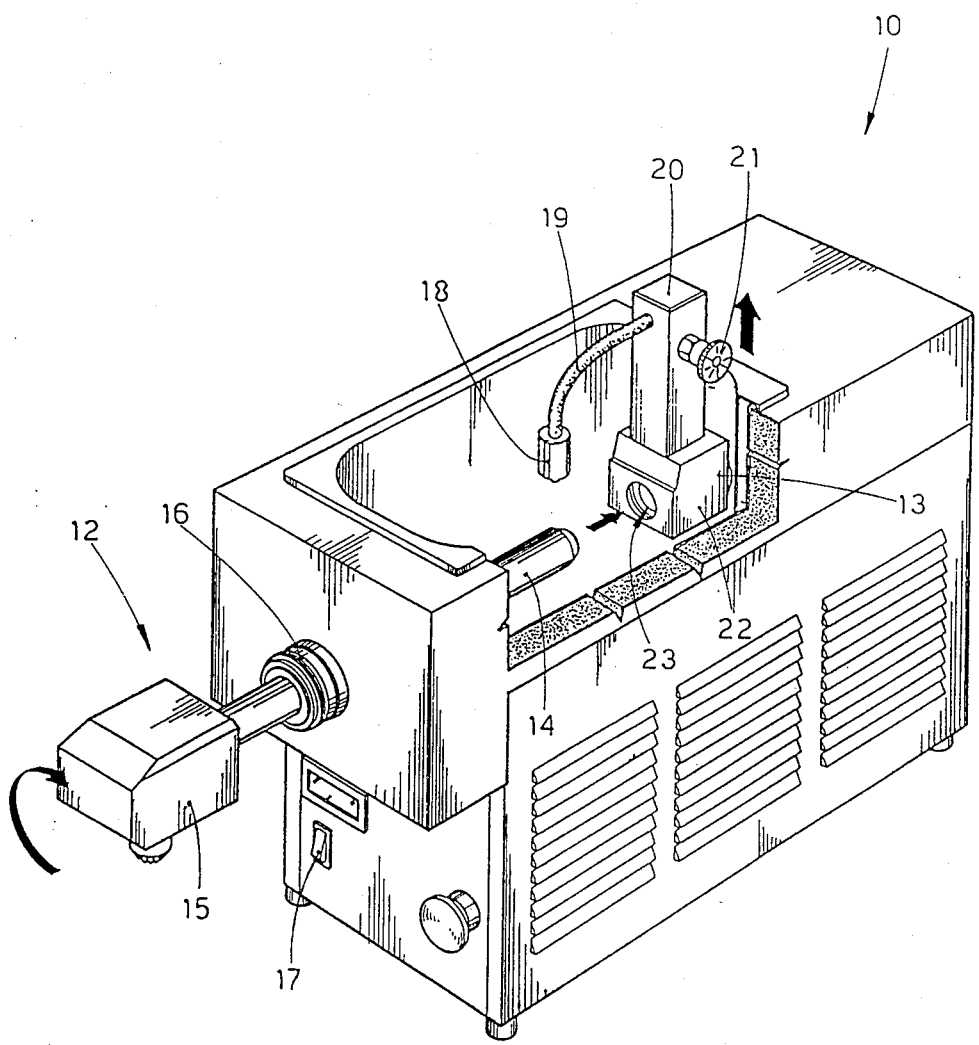
FIG. 6 shows an assembly of some of the parts of the embodiment of FIG. 1.
Figure 7:
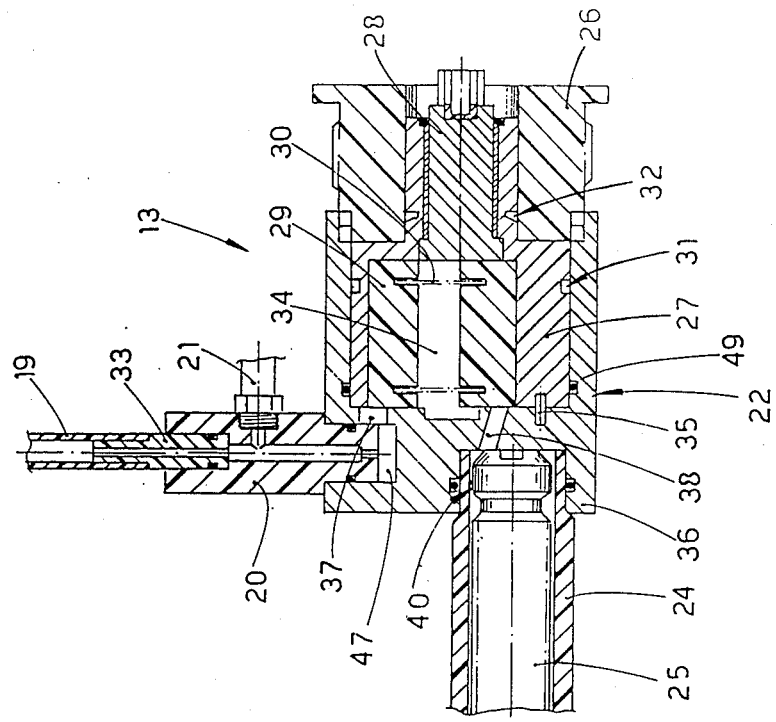
FIG. 7 shows a lengthwise vertical section of the cream of the invention.
Figure 7:
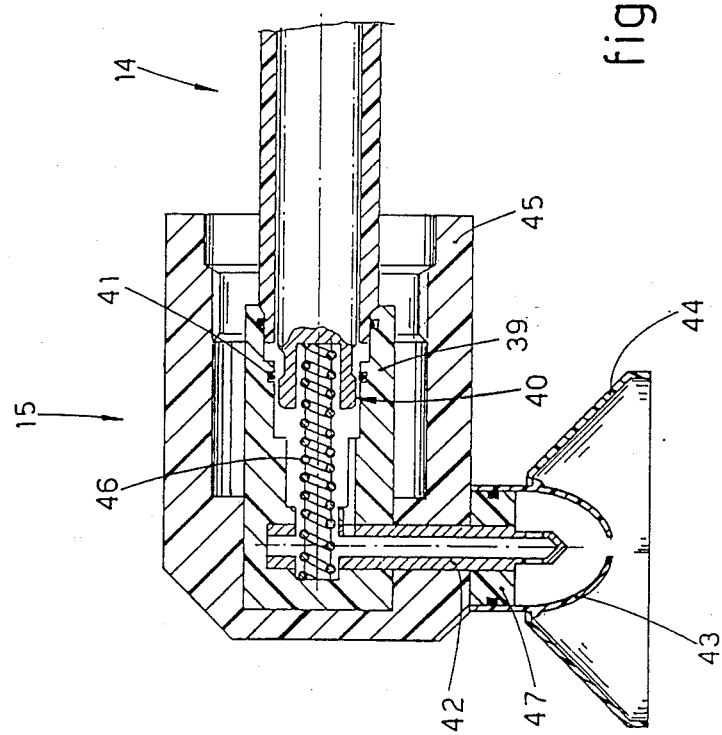

FIG. 6 shows a cream whipper 10 partially cutaway to illustrate a zone for holding a vessel 11 (FIG. 1) and an assembled mechanism 12 to form whipped cream.

The cream whipper 10 is actuated by a switch 17, while the assembled mechanism 12 to form cream consists of an aspiration-compression unit 13, a unit 14 to whip the cream and a delviery unit 15 which can be anchored to the casing of the cream whipper 10 by means of a support 16.

The aspiration-compression unit 13 consists of a suction intake 18, an aspiration pipe 19, a connection pillar 20, a tap to regulate air intake 21 and a pump unit 22 which comprises a hole 23 for attachment of the cream-forming unit 14 and also a hole 47 for attachment of the pillar 20. The aspiration-compression unit 13 draws the cream from the vessel 11.

The pump unit 22 can be connected with a bayonet coupling, and secured by rotation, to a collar 26, which serves as a damper and barrier for an electric motor, which is not shown here.

The pump unit 22 has a square or rectangular section to assist handling even when it is dirty with cream. When freed from the collar 26, the pump unit 22 can be easily dismantled.

Figure 4:
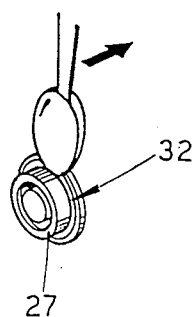
Figure 5:
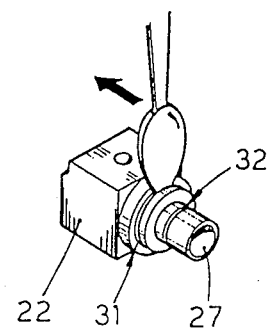

If the pump chamber 27, of which a seal is obtained with a packing 49 and which is prevented from rotating in relation to the pump body 36 by a pin 35, is hard to withdraw owing to some cream having been drawn inwards along its peripheral edge, it can be extracted by acting on notches 32 and 31 with a simple spoon (FIGS. 4 and 5).

When the pump chamber 27 has been withdrawn, a rotor 28 can be readily extracted, as also can vanes 29 and springs 30 from a diametral groove 34 located in the body of the rotor 28.

In the variants of FIGS. 8 and 9 the pump chamber 127 and pump body 136 have been embodied so as to face each other frontally and to be connected with clamping elements 48, the purpose being to obviate any difficulty in cleaning the packing 49.

Positioning pins may also be provided.

In this way the packing 149 becomes a frontal packing and is easy to clean and inspect, thus improving the hygiene and safety of the invention.

If the cream becomes drawn between the front surfaces of the pump chamber 127 and pump body 136, a peripheral groove 132 enables such cream to be easily removed.

The clamping elements 48 may be of any type, including rapid clamping elements.

The connection pillar 20, pipe-holder sleeve 33 and pipe 19 too can be readily dismantled by being pulled from each other.

Cleaning of the pump body 36 is simplified by the linear positioning of the holes for aspiration 37 and delivery 38.

The unit 14 to whip the cream is also easy to dismantle and clean; it consists of a pipe 24 and grooved shaft 25.

The pipe 24 is introduced into the hole 23 for attachment of the pump unit 22 and into a suitable hole in an intermediate element 39 of the delivery unit 15.

The grooved shaft 25 is inserted into the pipe 24.

A spring 46 thrusts the shaft 25 towards the pump unit 22, and, by means of cooperation of an annular protrusion 40 with a toric packing 41, the shaft 25 creates a watertight seal, which is opened when the pressure generated by the cream and air thrust between the pipe 24 and shaft 25 by the pump unit 22 overcomes the thrust of the spring 40. The movement of the cream through the confined space between the pipe 24 and the shaft 25 whips the cream.

By withdrawing the unit 14 that whip the cream from the delivery unit 15 it is possible to extract the spring 46.

When the spring 46 has been withdrawn, a cream discharger element 42 and thereafter the intermediate element 39 can be extracted. The cream discharger element 42 can be dismantled into its two elements, the spring 46 and outlet 47 by mere separation.

A nozzle 43 to produce the jagged shape of the discharged cream and splash guards 44 can be easily withdrawn in the manner of the know art.

A casing 45 of the delivery unit 15 can be readily cleaned, as also can all other components.

To fit the delivery unit 15 to its support 16, it is enough to screw it as shown in FIG. 6.

I claim:

1. A simplified cream whipper, comprising:
a vessel which holds cream;
refrigeration means for refrigerating the cream in the vessel; and
a whipping assembly connected with the vessel which aspirates, whips, and delivers the cream, said whipping assembly comprising:
an aspiration-compression unit which draws cream from the vessel and aspirates the cream, said aspiration-compression unit including a pump having a pump chamber located within a pump body and attached thereto;
a whipping unit which receives the cream from said aspiration-compression unit and whips the cream, and
a delivery unit which receives whipped cream from said whipping unit and dispenses the whipped cream;
wherein said aspiration-compression unit, whipping unit, and delivery unit can be dismantled and withdrawn from each other and can be easily and individually cleaned.

2. A simplified cream whipper as claimed in claim 1, further comprising a motor which drives said aspiration-compression unit, wherein said aspiration-compression unit is connected to the motor by a bayonet coupling.

3. A simplified cream whipper as claimed in claim 1, wherein said pump chamber has annular notches formed therein which facilitate removal of the pump chamber from the pump body.

4. A simplified cream whipper as claimed in claim 3, wherein said aspiration-compression unit further comprises a rotor which can be withdrawn from the pump chamber after the pump chamber is removed from the pump body, and vanes and springs which can be withdrawn from said rotor after the rotor is withdrawn from the pump chamber.

5. A simplified cream whipper as claimed in claim 1, wherein said pump chamber has an annular groove formed therein which facilitates frontal removal of the pump chamber from the pump body.

6. A simplified cream whipper as claimed in claim 5, wherein said aspiration-compression unit further comprises a rotor which can be withdrawn from the pump chamber after the pump chamber is removed from the pump body, and vanes and springs which can be withdrawn from said rotor after the rotor is withdrawn from the pump chamber.

7. A simplified cream whipper as claimed in claim 1, wherein said pump body has an opening formed therein, and said aspiration-compression unit further comprises a connection pillar removably mounted in said opening, and a sleeve and pipe removably connected to said connection pillar, said pipe leading to the cream located in the vessel.

8. A simplified cream whipper as claimed in claim 1, wherein said pump body has an attachment hole formed therein in which the whipping unit is removably mounted, and wherein the whipping unit comprises a grooved shaft located within a pipe, said grooved shaft being removable from the pipe after the whipping unit is separated from the pump body.

9. A simplified cream whipper as claimed in claim 1, wherein said delivery unit comprises a casing having an opening formed therein in which one end of the whipping unit is removably mounted, and a biasing spring located in the casing, said biasing spring being removable from the casing after whipping unit is separated from the casing.

10. A simplified cream whipper as claimed in claim 9, wherein said delivery unit further comprises a cream discharger mounted in the casing which is removable after said biasing spring is removed from the casing, and an intermediate element mounted in the casing which is removable after said cream discharger is removed from the casing.

11. A simplified cream whipper as claimed in claim 10, wherein said one end of said whipping unit has an annular protrusion which cooperates with an annular packing formed in the intermediate element when said cream whipper is not dispensing cream to form a hydraulic seal, said annular protrusion and annular packing being biased towards each other by said biasing spring.

* * * * *